(12) United States Patent
Jeong

(10) Patent No.: US 12,679,268 B2
(45) Date of Patent: Jul. 14, 2026

(54) IMAGE CONVERSION LAMP DEVICE

(71) Applicant: HYUNDAI MOBIS CO., LTD., Seoul (KR)

(72) Inventor: Haekwang Jeong, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 419 days.

(21) Appl. No.: 18/478,094

(22) Filed: Sep. 29, 2023

(65) Prior Publication Data

US 2024/0116426 A1 Apr. 11, 2024

(30) Foreign Application Priority Data

| | | |
|---|---|---|
| Oct. 11, 2022 | (KR) | .......................... 10-2022-0129390 |
| Oct. 26, 2022 | (KR) | .......................... 10-2022-0139138 |
| Nov. 9, 2022 | (KR) | .......................... 10-2022-0148455 |

(51) Int. Cl.

| | |
|---|---|
| *B60Q 1/04* | (2006.01) |
| *B60Q 1/076* | (2006.01) |
| *F21S 41/125* | (2018.01) |
| *F21S 41/40* | (2018.01) |
| *F21S 41/50* | (2018.01) |
| *F21S 45/40* | (2018.01) |
| *F21W 102/13* | (2018.01) |

(52) U.S. Cl.
CPC ............. *B60Q 1/045* (2013.01); *B60Q 1/076* (2013.01); *F21S 41/125* (2018.01); *F21S 41/40* (2018.01); *F21S 41/50* (2018.01); *F21S 45/40* (2018.01); *B60Q 2900/40* (2022.05); *F21W 2102/13* (2018.01)

(58) Field of Classification Search
CPC .... B60Q 1/045; B60Q 1/076; B60Q 2900/40; B60Q 1/05; B60Q 1/068; F21S 41/125; F21S 41/40; F21S 41/50; F21S 45/40; F21S 41/321; F21S 41/675; F21S 41/148; F21W 2102/13
See application file for complete search history.

(56) References Cited

U.S. PATENT DOCUMENTS

| | | | | |
|---|---|---|---|---|
| 3,688,149 | A * | 8/1972 | Pitkjaan | ................ F21S 41/295 362/346 |
| 4,533,860 | A * | 8/1985 | Saito | ...................... B60Q 1/076 318/673 |
| 12,000,564 | B1 * | 6/2024 | Zheng | ..................... F21V 11/12 |
| 2008/0266890 | A1 * | 10/2008 | Mochizuki | ............. B60Q 1/076 362/524 |
| 2013/0135887 | A1 * | 5/2013 | Otani | ..................... F21S 41/285 362/516 |
| 2021/0033256 | A1 * | 2/2021 | Lim | ...................... F21S 41/675 |
| 2022/0034473 | A1 * | 2/2022 | Kim | ...................... F21S 41/683 |
| 2022/0371507 | A1 * | 11/2022 | Kim | ...................... B60Q 1/076 |
| 2024/0102629 | A1 * | 3/2024 | Kim | ...................... F21S 41/39 |

FOREIGN PATENT DOCUMENTS

KR 20210016166 A 2/2021

* cited by examiner

*Primary Examiner* — Christopher E Dunay
(74) *Attorney, Agent, or Firm* — NovoTechIP International PLLC

(57) ABSTRACT

Provided is a lamp device installed on the front of a vehicle, and the light device may connect a drive unit to a light source module to thus rotate an optical module, thereby implementing various optical image patterns and also converting the optical image pattern.

12 Claims, 17 Drawing Sheets

600(610, 620)

IMAGE CONVERSION LAMP DEVICE

CROSS-REFERENCE TO RELATED APPLICATIONS

This application claims priority under 35 U.S.C. § 119 to Korean Patent Application No. 10-2022-0129390, filed on Oct. 11, 2022 and No. 10-2022-0139138, filed on Oct. 26, 2022 and No. 10-2022-0148455, filed on Nov. 9, 2022 in the Korean Intellectual Property Office, the disclosure of which is incorporated herein by reference in its entirety.

TECHNICAL FIELD

The following disclosure relates to a lamp device installed on the front of a vehicle.

BACKGROUND

A vehicle may have a lamp device. The lamp device may enable a driver of a vehicle to clearly see an object in a driving direction during night driving, and inform another vehicle driver or another road user of a driving state of the vehicle. A head lamp (or headlight) among the lamp devices functions to illuminate a road in front of the driving vehicle.

A function of implementing an image has been recently added to the lamp device such as the headlamp. A conventional lamp device implementing an image may conventionally implement or change an image by turning on or off a light source of a light source unit while the light source unit is fixed.

In this conventional method, the lamp device has a limitation in forming or converting an image. See, e.g., Korean Patent Laid-Open Publication No. 10-2021-0016166 (Dec. 15, 2021).

SUMMARY

An embodiment of the present disclosure is directed to providing an image conversion lamp device which may implement a lamp design in various shapes through movement of a light source unit by mounting a drive unit on a light source unit of the lamp device.

Another embodiment of the present disclosure is directed to providing an image conversion lamp device in which a drive unit rotates a cover part capable of opening or blocking a light source, thereby implementing various optical image patterns and also converting the optical image pattern.

Still another embodiment of the present disclosure is directed to providing an image conversion lamp device which may implement various images.

In one general aspect, a lamp device includes: a lamp housing installed on the front of a vehicle, and having an accommodation space therein; at least one optical module disposed in the accommodation space; a gear unit positioned in the optical module to rotate the optical module; and a drive unit transmitting a rotational power to the gear unit.

The lamp device wherein each optical module includes: a light source for emitting light; an optical module shaft protruding downward from the light source to the gear unit; and a lighting plate installed in front of the light source.

The lamp device wherein the lighting plate includes a front pattern to pattern light emitted from the light source.

The lamp device further comprising a plurality of optical modules, the lighting plates of the plurality of optical modules having a common front pattern.

The lamp device further comprising a plurality of optical modules, the front patterns of the plurality of optical modules being different from each other.

The lamp device further comprising a plurality of optical modules, wherein the lighting plates of the plurality of optical modules are of colors different from each other.

The lamp device wherein: each optical module further includes a heat dissipation unit to dissipate heat from the light source, and the heat dissipation unit is spaced apart from the light source by a set distance.

The lamp device wherein: the lamp device comprises a plurality of optical modules; and the gear unit comprises a shaft gear installed on the optical module shaft of each optical module; and a connecting gear is disposed between the plurality of shaft gears installed on the plurality of optical module shafts to interface the plurality of shaft gears to each other.

The lamp device wherein the plurality of optical modules are arranged along a line to correspond to a shape of the lamp housing.

The lamp device wherein the drive unit is installed on a shaft gear or positioned in a central region of the shaft gears or on the connecting gear.

The lamp device wherein a width of the connecting gear is larger than a width of the shaft gears.

The lamp device further comprising a plurality of optical modules, wherein each of the lighting plates of the plurality of optical modules includes a side pattern on one side thereof.

The lamp device wherein the lighting plates of the plurality of optical modules have side patterns different from each other.

The lamp device wherein the lighting plates of the plurality of optical modules have a common side pattern.

The lamp device wherein: the connecting gear is installed on a connecting shaft protruding from the lamp housing; the connecting gear has a guide groove formed at an angle set in a circumferential direction; the connecting shaft has a protruding guide protruding from a side thereof; and the protruding guide is rotatable in the guide groove.

In another general aspect, a lamp device includes: at least one light source positioned in a lamp housing; at least one cover part disposed in front of the light source to correspond to the light source, and movable from an opening position where the cover part opens the front of the light source to a blocking position where the cover part closes the front of the light source; a drive unit selectively moving the cover part from the opening position to the blocking position; and a link part disposed between the cover part and the drive unit, and transmitting power of the drive unit to the cover part, wherein the cover part performs a rotational movement between the opening position and the blocking position.

The lamp device wherein the at least one cover part has a rotation shaft positioned on one side thereof, the rotation shaft has a gear installed on one end thereof, and the gear changes a linear movement of the link part into the rotational movement by the power of the drive unit, and the link part includes a first link member disposed where a first curvature of the lamp housing is formed and a second link member disposed where a second curvature of the lamp housing is formed, the lamp housing having a curvature formed in a lengthwise direction, and each of the first link member and the second link member comprises a rail gear to mesh with the gear.

The lamp device wherein: the first link member and the second link member are connected to each other by a connection member, the connection member being connected to the drive unit, and each of the first link member and the second link member has a guide groove formed to correspond to the gear to have a set movement amount.

The lamp device wherein: the at least one cover part comprises multiple cover parts that each form a light emitting pattern, the light emitting patterns being a common pattern or different from each other, and the light emitting patterns of the cover parts have a common color or different colors.

In still another general aspect, a lamp device includes: a light emitting unit; a bezel surrounding the light emitting unit; and a cover member opening and closing the front of the light emitting unit, wherein the cover member includes a cover plate movable between an opening position where the cover plate opens the front of the light emitting unit and a closing position where the cover plate closes the front of the light emitting unit, and a drive unit moving the cover plate between the opening position and the closing position, the cover plate is movable in a groove formed in the bezel, and the opening position and the closing position are provided in a vertical direction of a vehicle.

The lamp device wherein: the bezel has an opening through which light passes, and a step part formed below the opening, the groove is formed in the step part, and the cover member includes a stopper positioned at a bottom of the cover plate and having a width larger than that of the groove.

The lamp device wherein: the drive unit includes a shaft coupled to the cover plate and an actuator moving the shaft in the vertical direction, and the shaft is coupled to a center point of the cover plate in a width direction.

The lamp device wherein: the shaft includes a ball-shaped fastening part, and the cover plate includes an insertion part which has a shape corresponding to that of the fastening part and into which the fastening part is inserted, or the shaft includes a wing-shaped fastening part which is elastic, and the cover plate includes an insertion part smaller than the wing-shaped fastening part through which the wing-shaped fastening part inserted.

The lamp device wherein: the cover plate has a plurality of through holes for forming an image when light from the light emitting unit passes through the through holes, and the through holes are positioned to correspond to the light emitting unit when the cover plate is in the closing position.

The lamp device further comprising a controller for controlling the light emitting unit and the cover member, wherein the controller is configured to control the light emitting unit and the cover member such that a current provided to the light emitting unit with the cover member in the closed position is lower than a current provided to the light emitting unit with the cover member in the open position.

DETAILED DESCRIPTION

Figure 1:
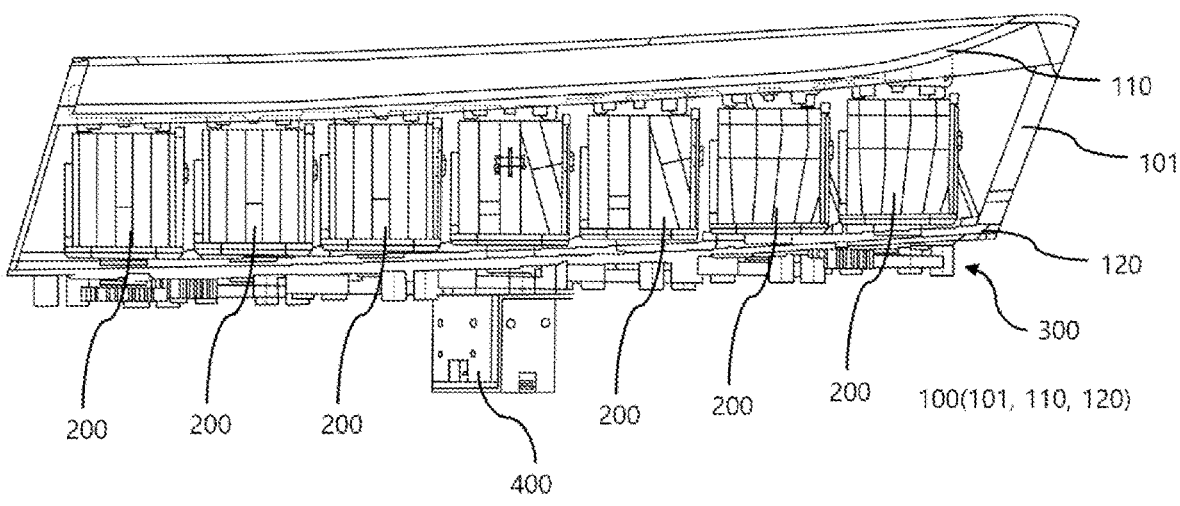
FIG. 1 is a front view of a lamp device according to an embodiment of the present disclosure (that partially includes a perspective view).
Figure 2:
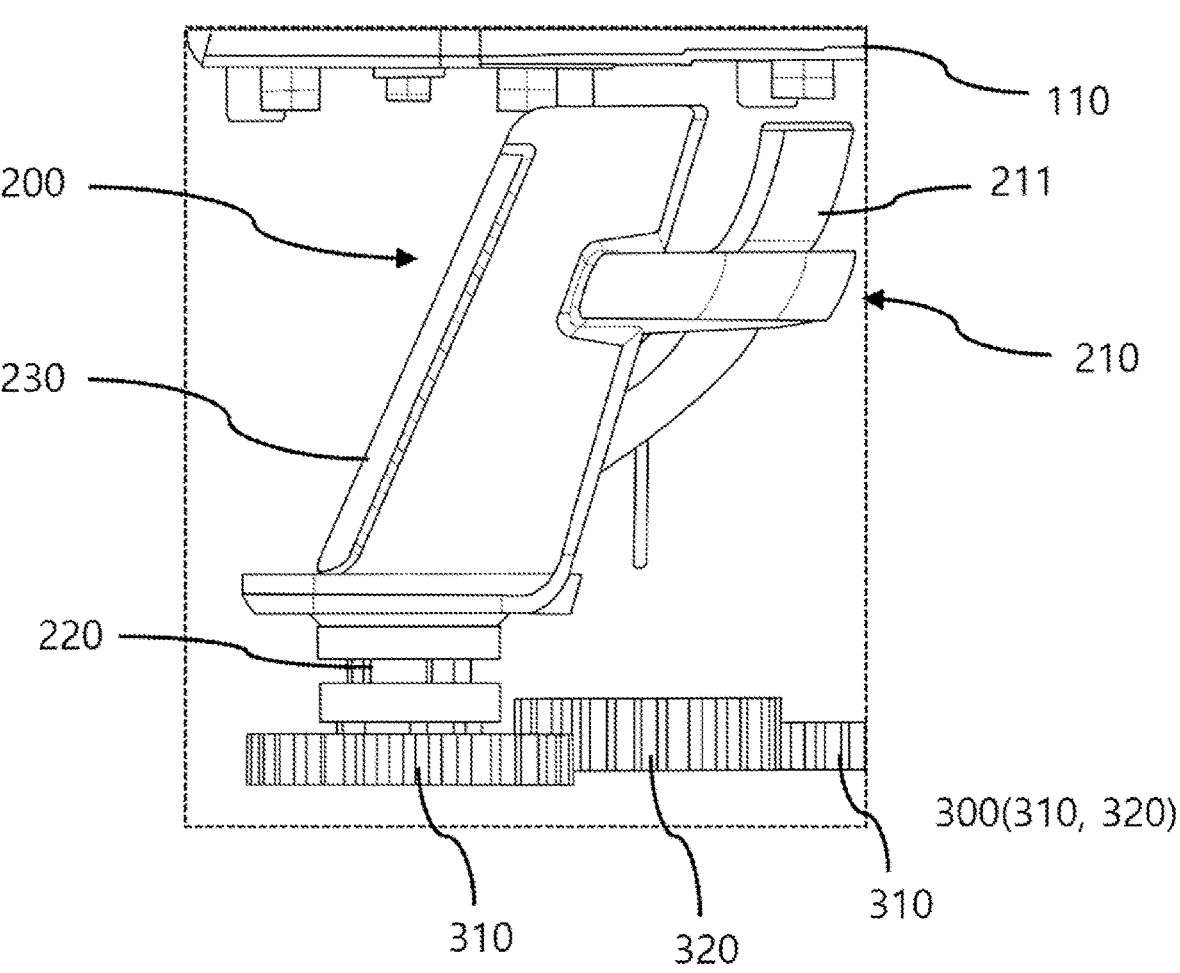
FIG. 2 is an enlarged view of one optical module in FIG. 1 from its side.

In order to fully understand the present disclosure, embodiments of the present disclosure are described in more detail with reference to the accompanying drawings. The embodiments of the present disclosure may be variously modified, and the scope of the present disclosure should not be construed as being limited to the following embodiments described in detail. The embodiments are provided to more fully explain the present disclosure to those skilled in the art. Therefore, the shapes of elements in the drawings may be exaggerated to emphasize a clearer explanation. It should be noted that the same member may be indicated by the same reference numeral in each drawing. In addition, the description omits detailed descriptions of known functions and configurations that may unnecessarily obscure the gist of the present disclosure.

Hereinafter, the description describes the embodiments of the present disclosure with reference to the accompanying drawings.

Referring to FIGS. 1 to 5, a lamp device according to an embodiment of the present disclosure may include a lamp housing 100, an optical module 200, a gear unit 300, and a drive unit 400.

The lamp housing 100 may be installed on the front of a vehicle, and have an accommodation space 110 therein. At least one optical module 200 may be disposed in the accommodation space 110 to face the front of the vehicle in the accommodation space 110.

The gear unit 300 may be positioned in the optical module 200. At least one optical module 200 may be provided, and the plurality of optical modules may be provided. The gear unit 300 may be positioned in each of the plurality of optical modules 200. The gear unit 300 may rotate the optical module 200.

The drive unit 400 may be connected to the gear unit 300 to transmit a rotational power to the gear unit 300.

The lamp housing 100 may have an upper lamp housing 110 formed in an upper side and a lower lamp housing 120 formed in a lower side. The accommodation space 101 may be positioned between the upper lamp housing 110 and the lower lamp housing 120.

An upper portion of the optical module 200 may be installed in the upper lamp housing 110 and its lower portion may be installed in the lower lamp housing 120. The upper and lower portions of optical module 200 may each be rotated.

The optical module 200 may include a light source 210 emitting light. The light source 210 may include a reflecting plate 211 such as a light emitting diode (LED) emitting light and directing light forward.

The optical module 200 may include an optical module shaft 220 protruding downward from the light source 210. The optical module shaft 220 may protrude downward from a lower end of the optical module 200. The optical module shaft 220 may be inserted into and pass through the lower lamp housing 120.

The optical module 200 may include a lighting plate 230 installed in front of the light source 210. The lighting plate 230 may allow light emitted from the light source 210 to have a set optical image pattern. The lighting plate 230 may be positioned in the optical module 200. When the plurality of optical modules 200 are provided, the lighting plate 230 may be positioned in each of the lighting modules 200.

Figures 3A, 3B:
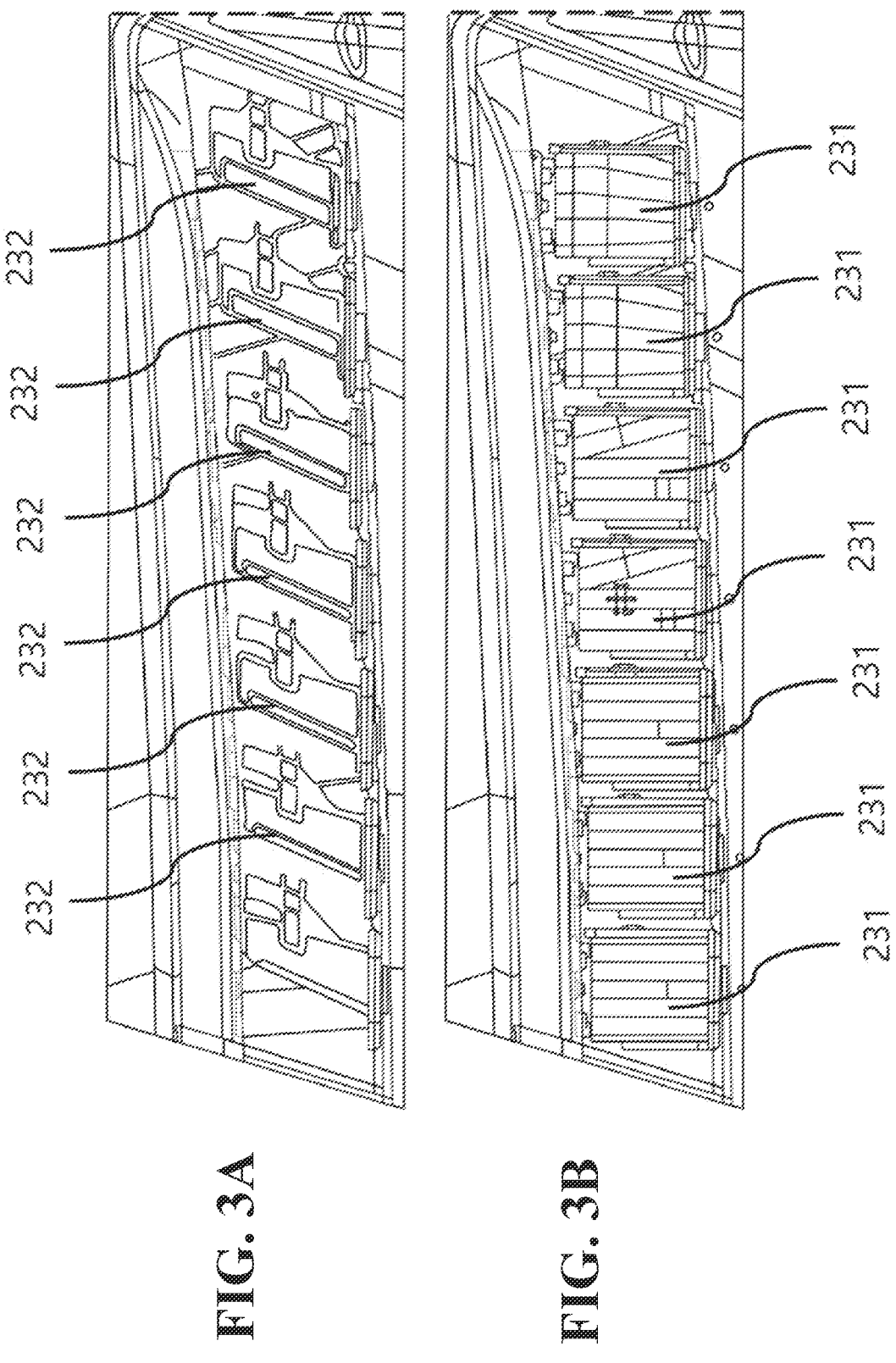
FIGS. 3A and 3B are views each showing an optical image pattern of the lamp device according to an embodiment of the present disclosure.
Figure 4:
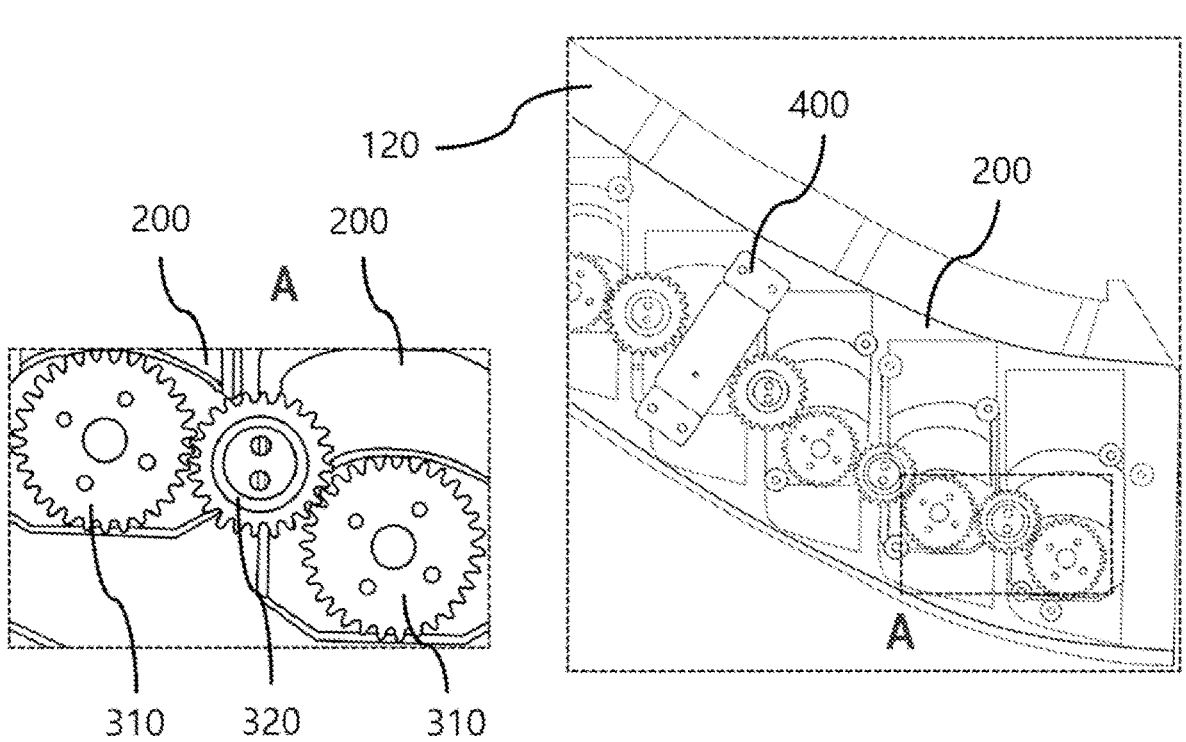
FIG. 4 shows a view showing a bottom surface of FIG. 1 (that partially includes a perspective view) and an enlarged view of a portion of a gear unit.
Figure 5:
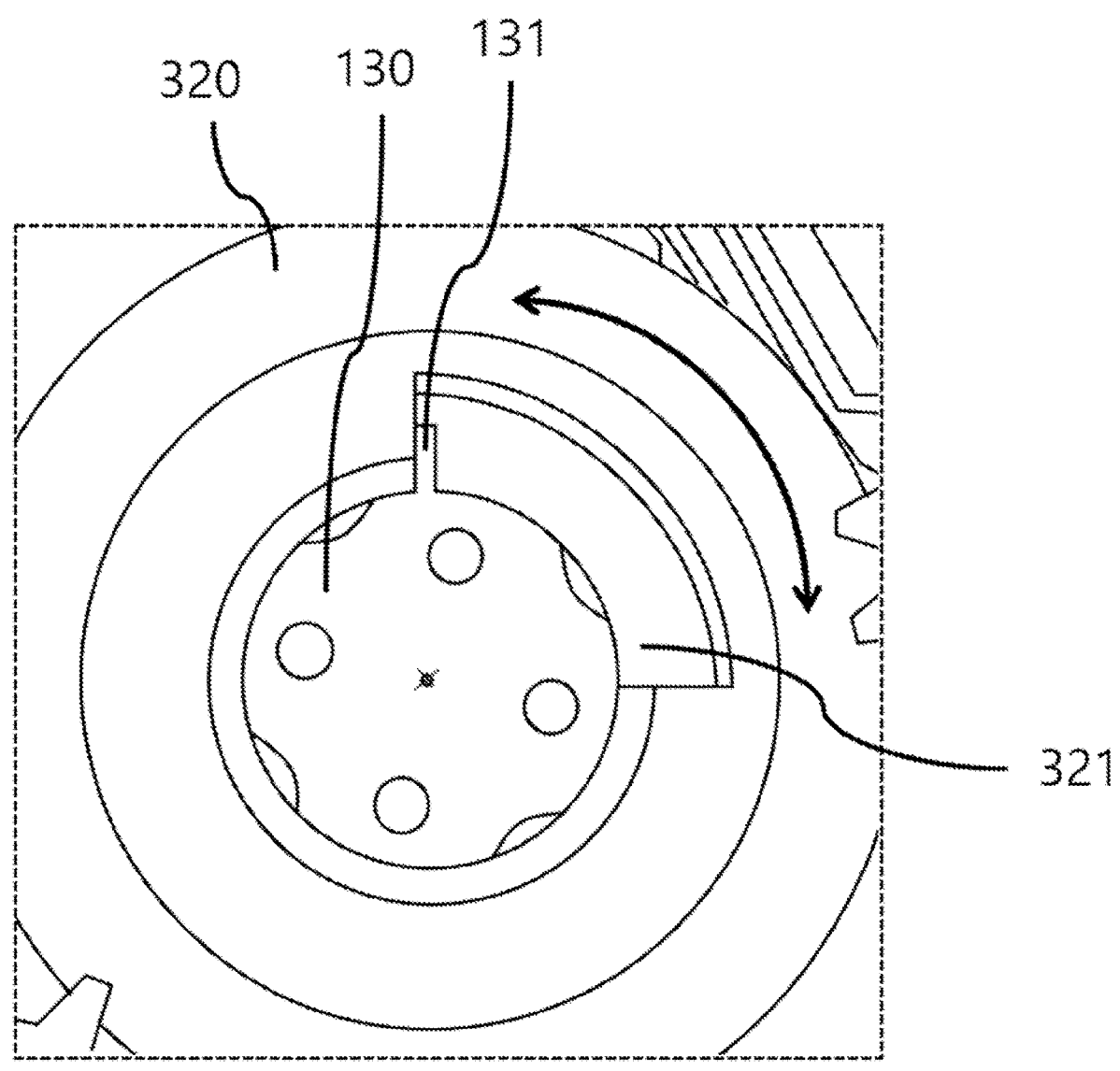
FIG. 5 is a view showing another embodiment of a connecting gear in FIG. 1.

Each lighting plate 230 may form a front pattern 231. The front pattern 231 may form the optical image pattern set toward the front of the vehicle when the optical module 200 is not rotated and faces the front of the vehicle. Different front patterns 231 may respectively be formed in the plurality of optical modules 200. FIG. 3B shows an example of the optical image pattern formed by the front pattern 231 when the optical module 200 is not rotated and faces the front of the vehicle. It is shown here that the first to the third from the left, the fourth and the fifth from the left, and the first and the second from the right may each form the same front pattern 231.

As such, the plurality of optical modules 200 may implement a desired optical image pattern through the lighting plates 230 respectively forming the same or different front patterns 231

The lighting plate 230 of the optical module 200 may form a color. When the plurality of optical modules 200 are provided, the respective lighting plates 230 may form colors different from each other. In this way, it is possible to implement the optical image pattern having a set color impression.

A combination of colors of the front pattern 231 and those of the lighting plate 230 may implement the optical image patterns of various shapes.

In addition, the lighting plate 230 of the optical module 200 may form a side pattern 232 on one side thereof. The plurality of optical module 200 may have each lighting plate 230 forming the side pattern 232 on one side thereof. The side patterns 232 may have the same or different shapes from each other. FIG. 3A shows that the plurality of optical modules 200 are rotated, and the side of the optical modules 200 thus faces the front of the vehicle, and shows that the side patterns 232 formed on the sides thereof implement the set optical image pattern. FIG. 3A shows an example of the optical image pattern when the side patterns 232 are all different from each other. Some of the side patterns 232 may have the same pattern.

The optical module 200 may further include a heat dissipation unit (not shown) dissipating heat from the light source 210. The heat dissipation unit may be spaced apart from the light source 210 by a set distance.

The optical module 200 needs to include the heat dissipation unit such as a heat sink to cool heat dissipated by the light source 210. The heat dissipation unit may be generally attached to or installed to be close to the light source 210.

In the lamp device according to the present disclosure, the optical module 200 may be rotated by a rotational power of the drive unit 400. It is necessary to reduce a rotational load of the optical module 200 during the rotation. To this end, the drive unit 400 may rotate the optical module 200 with a little power by separating the light source 210 and the heat dissipation unit from each other.

The gear unit 300 may include a shaft gear 310 and a connecting gear 320. The shaft gear 310 may be installed on the optical module shaft 220. Each of the optical modules 200 may include the gear unit 300, and the shaft gear 310 may be installed in each of the optical modules 200 when the plurality of optical modules 200 are provided. The connecting gear 320 may be disposed between the plurality of shaft gears 310. The connecting gear 320 may connect the plurality of shaft gears 310 to each other so that all of the plurality of optical modules 200 may be rotated even when using one drive unit 400.

The plurality of optical modules 200 may be arranged in a line to correspond to a shape of the lamp housing 100. When the lamp housing 100 has a curved arc shape, the plurality of optical modules 200 may be arranged in a line in the lamp housing 100 to correspond to the arc shape.

The lamp device according to the present disclosure may form one drive unit 400 as described above. In order for one drive unit 400 to rotate and drive all the optical modules 200, the drive unit 400 may be installed on the shaft gear 310 or connecting gear 320 that is positioned in a central region of the shaft gears 310 and the connecting gears 320. A power loss of the drive unit 400 that is a power source of the optical module 200 may be minimized by installing the drive unit 400 in the center. Even one drive unit 400 may effectively rotate all of the plurality of optical modules 200.

A width of the connecting gear 320 may be larger than a width of the shaft gear 310. In the lamp housing 100, the lower lamp housing 120 may have a curvature that is not horizontal. The shaft gears 310 respectively installed in the plurality of optical modules 200 may form a step difference from each other in a height direction. It is possible to facilitate the rotation of the optical module 200 while overcoming the step formed between the shaft gears 310 by making the width of the connecting gear 320 larger than that of the shaft gear 310. Forming the width of the connecting gear 320 as larger as the step formed between the shaft gears 310 may reduce a shear stress occurring due to the rotational power of the drive unit 400 applied to a gear rather than increasing the width of the shaft gear 310, thereby greatly reducing a risk of gear breakage.

The lamp device may use a separate structure to control the rotation of the optical module 200 when adopting a direct current (DC) motor in which an amount of rotation of the optical module 200 may not be controlled through its own position control of the drive unit 400. In the above structure, the connecting gear 320 may be installed on a connecting shaft 130 protruding from the lamp housing 100, and the connecting gear 320 may have a guide groove 321 formed at an angle set in a circumferential direction. The connecting shaft 130 may have a protruding guide 131 protruding from its side, and the protruding guide 131 may be rotated in the guide groove 321. It is possible to adjust the amount of rotation of the optical module 200 through this structure. Here, the connecting shaft 130 may be positioned in the lower lamp housing 120 of the lamp housing 100.

Referring to FIGS. 6 to 11B, a lamp device according to another embodiment of the present disclosure may include a lamp housing 500, a cover part 600, a link part 700, and a drive unit 800.

The lamp housing 500 may be installed on the front of a vehicle and form an accommodation space therein. At least one light source 510 may be positioned in the lamp housing

500. The light source 510 may use a light emitting diode (LED) light or the like, and use a monochromatic light or different colors.

The cover part 600 may be disposed in front of the light source 510. At least one light source 510 may be provided, and at least one cover part 600 may be installed in the lamp housing 500 to correspond to the light source 510. The cover part 600 may be installed to be moved from an opening position where the cover part 600 opens the front of the light source 510 to a blocking position where the cover part 600 closes the front of the light source 510.

The plurality of light sources 510 may be positioned in the lamp housing 500, and the plurality of cover parts 600 may also be positioned to correspond thereto.

The drive unit 800 may selectively move the cover part 600 from the opening position to the blocking position. The cover part 600 may perform a rotational movement by a driving force of the drive unit 800 from the opening position to the blocking position or from the blocking position to the opening position. The drive unit 800 may use a motor or an actuator.

The link part 700 may be disposed between the cover part 600 and the drive unit 800. The link part 700 may transmit power of the drive unit 800 to the cover part 600.

The cover part 600 may perform the rotational movement between the opening position and the blocking position by the power of the drive unit 800. As described above, the cover part 600 may be moved from the blocking position to the opening position or from the opening position to the blocking position. The light source 510 may be opened when the cover part 600 is moved from the opening position to the blocking position. On the other hand, the light source 510 may be blocked when the cover part 600 is moved from the blocking position to the opening position.

The cover part 600 may have a rotation shaft 610 positioned on one side thereof. The cover part 600 may have a cover surface 640 covering the light source. The rotation shaft 610 may be positioned on one side of the cover surface 640. The rotation shaft 610 may be positioned on one side of the cover surface 640 for the cover surface 640 to block the light source 510 when the rotation shaft 610 is rotated. The rotation shaft 610 may be installed at the top and bottom of the lamp housing 500 to be rotated in a height direction.

The rotation shaft 610 may have a gear 620 installed on one end thereof. The gear 620 may change a linear movement of the link part 700 by the power of the drive unit 800 into the rotational movement. The drive unit 800 may perform the linear movement back and forth based on a front surface of the lamp housing 500 in a horizontal direction. The gear 620 of the rotation shaft 610 may receive the linear movement of the drive unit 800 through the link part 700 and convert the same into the rotational movement.

The lamp housing 500 may have a curvature formed in a length direction on the front surface facing the front of the vehicle. The link part 700 may include a first link member 710 disposed at a position where a first curvature 501 is formed in the lamp housing 500 having the curvature formed in the length direction. A second link member 720 may be disposed at a position where a second curvature 502 is formed.

The first link member 710 and the second link member 720 may mesh with the gear 620 and transmit the linear movement of the drive unit 800 to the gear 620. To this end, each of the first link member 710 and the second link member 720 may be a rail gear. The first link member 710 and second link member 720 may each have the gear only at a position corresponding to the gear 620 to mesh with the gear 620 rather than having the gears on all surfaces that mesh with the gear 620.

The first link member 710 and the second link member 720 may be connected to each other by a connection member 730. The connection member 730 may use one drive unit 800 to simultaneously move the first link member 710 and second link member 720 which are installed to be spaced apart from each other.

The connection member 730 may be fastened to the drive unit 800. The connection member 730 may include a connection part 731 connecting the first link member 710 with the second link member 720 and a coupling part 732 fastened to the drive unit 800. The connection part 731 and the coupling part 732 may be vertically coupled to each other. A coupled portion of the connection part 731 and the coupling part 732 may be rotated.

Each of the first link member 710 and the second link member 720 may have a guide groove 740 formed to correspond to the gear 620 to have a set movement amount.

The first link member 710 and the second link member 720 may each be controlled to be moved by a set amount of movement by forming the guide groove 740 to have a set length.

The cover part 600 may form a light emitting pattern 630. The light emitting patterns 630 may be the same as each other or different from each other. The light emitting pattern 630 may be formed on the cover surface 640 of the cover part 600.

Figure 6:
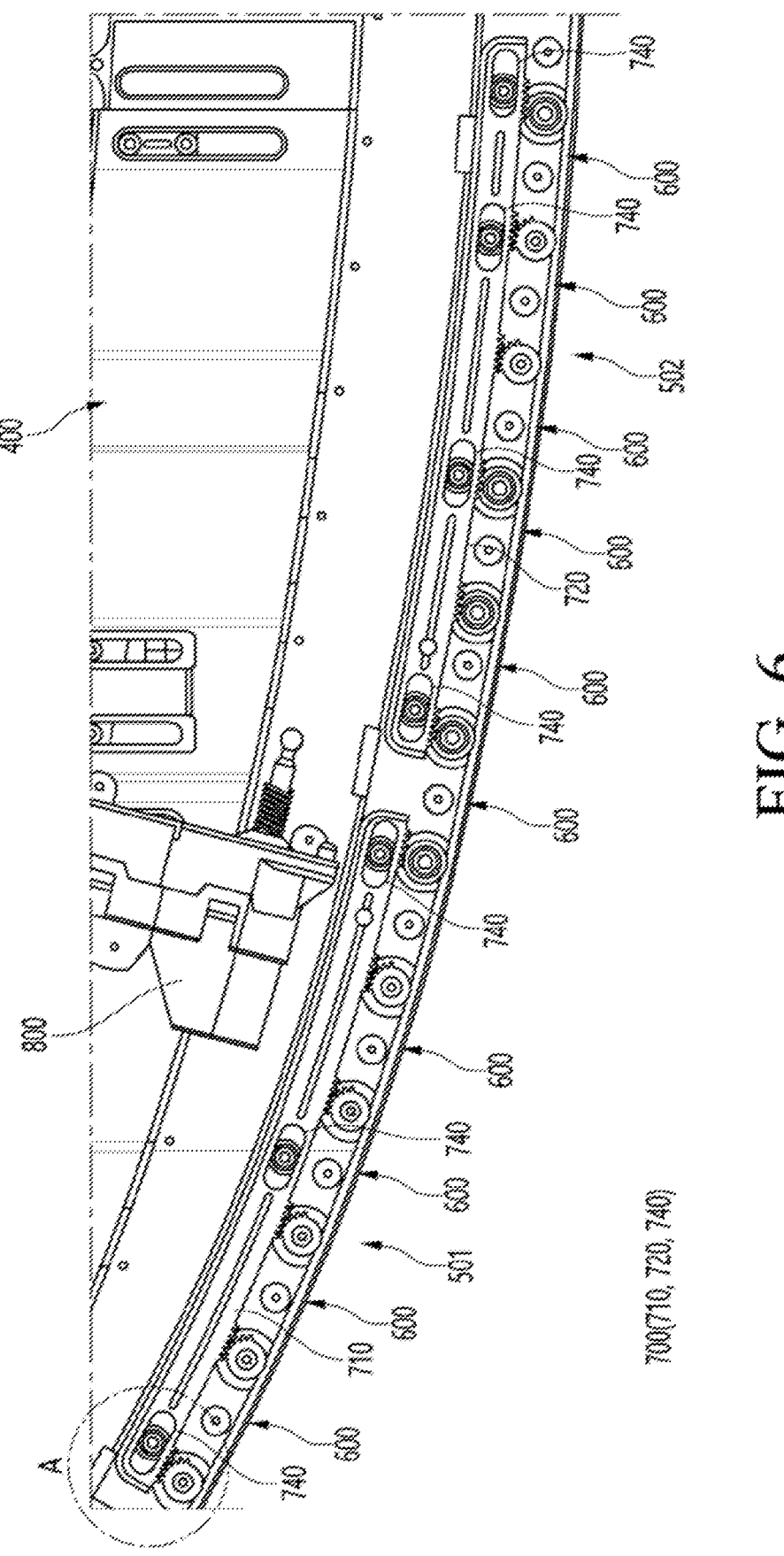
FIG. 6 is a view showing a lamp device from above according to another embodiment of the present disclosure.
Figure 7:
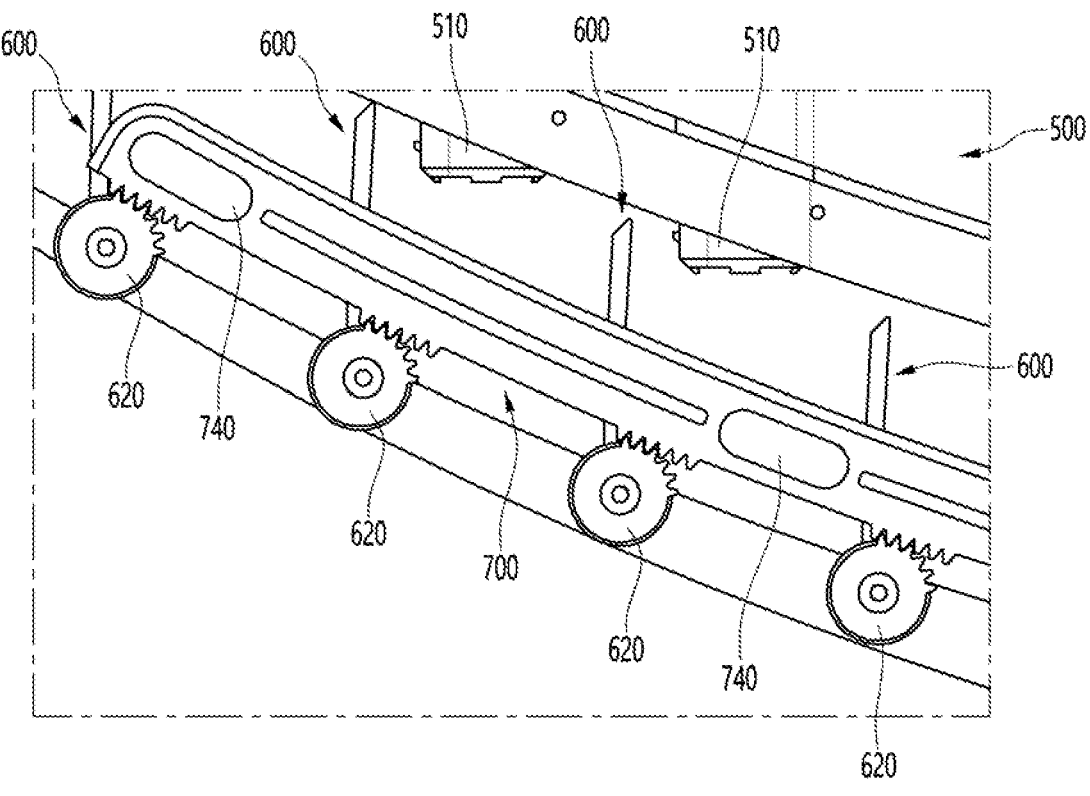
FIG. 7 is an enlarged view of a portion of FIG. 6.
Figure 8:
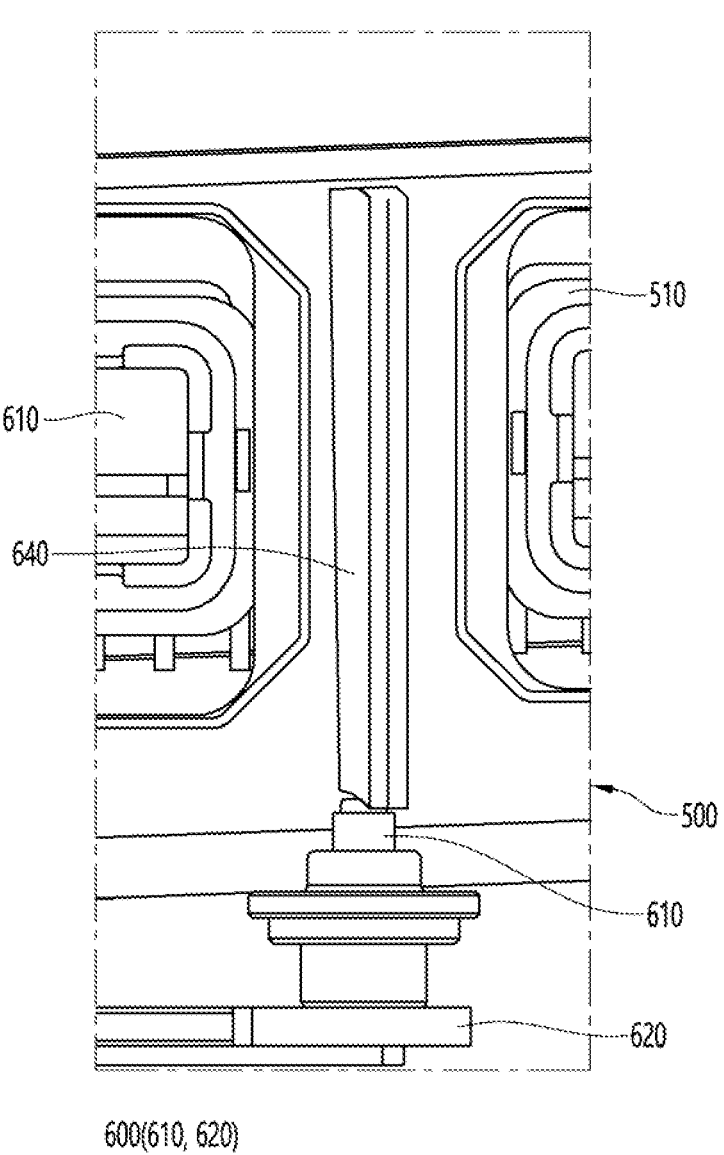
FIG. 8 is an enlarged view of a side of FIG. 6.
Figure 9:
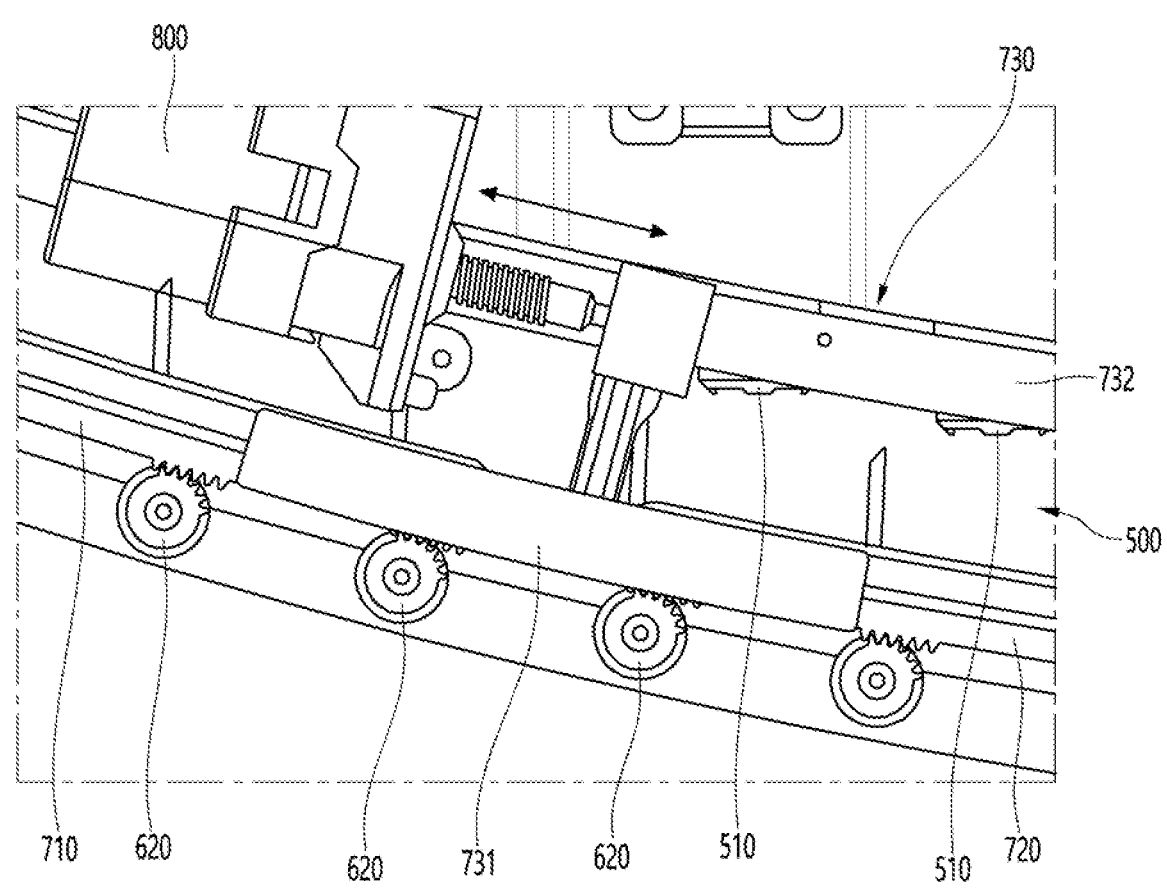
FIG. 9 is a partially enlarged view showing a drive unit of FIG. 6 and driving of the drive unit.
Figure 10:
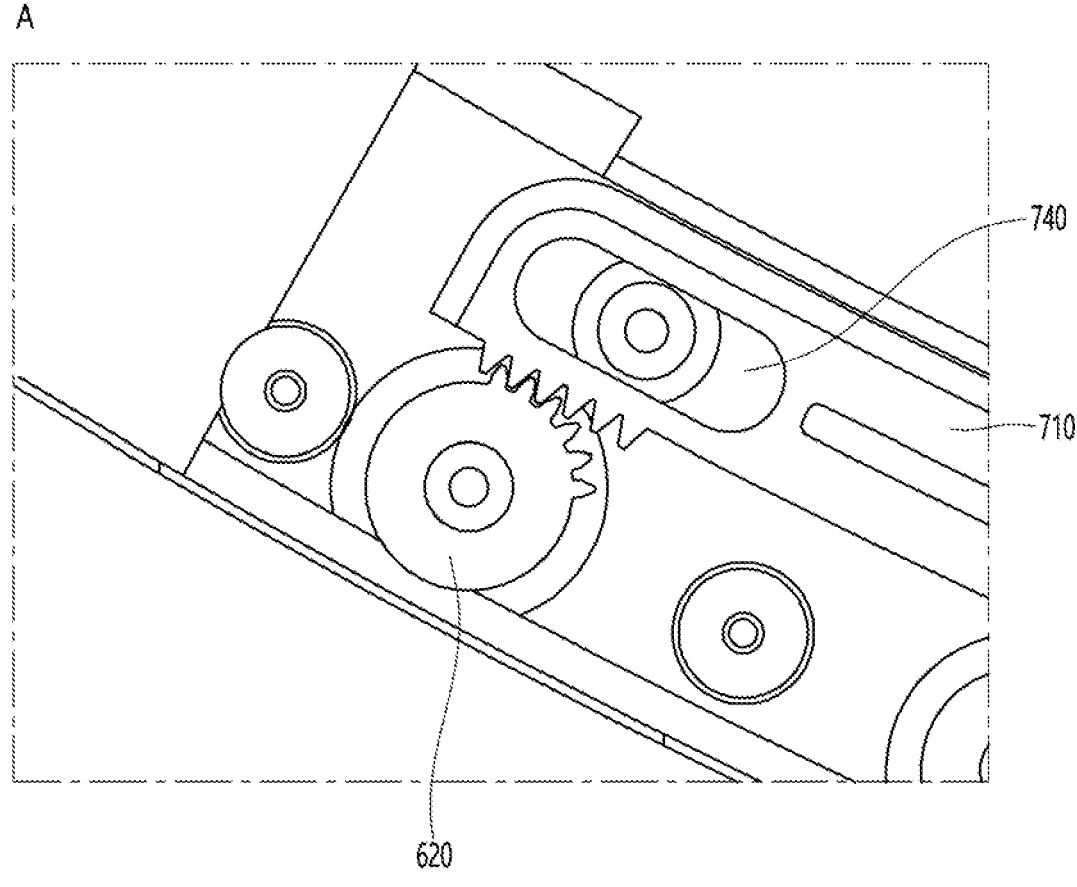
FIG. 10 is an enlarged view of a specific portion of FIG. 6.
Figures 11A, 11B:
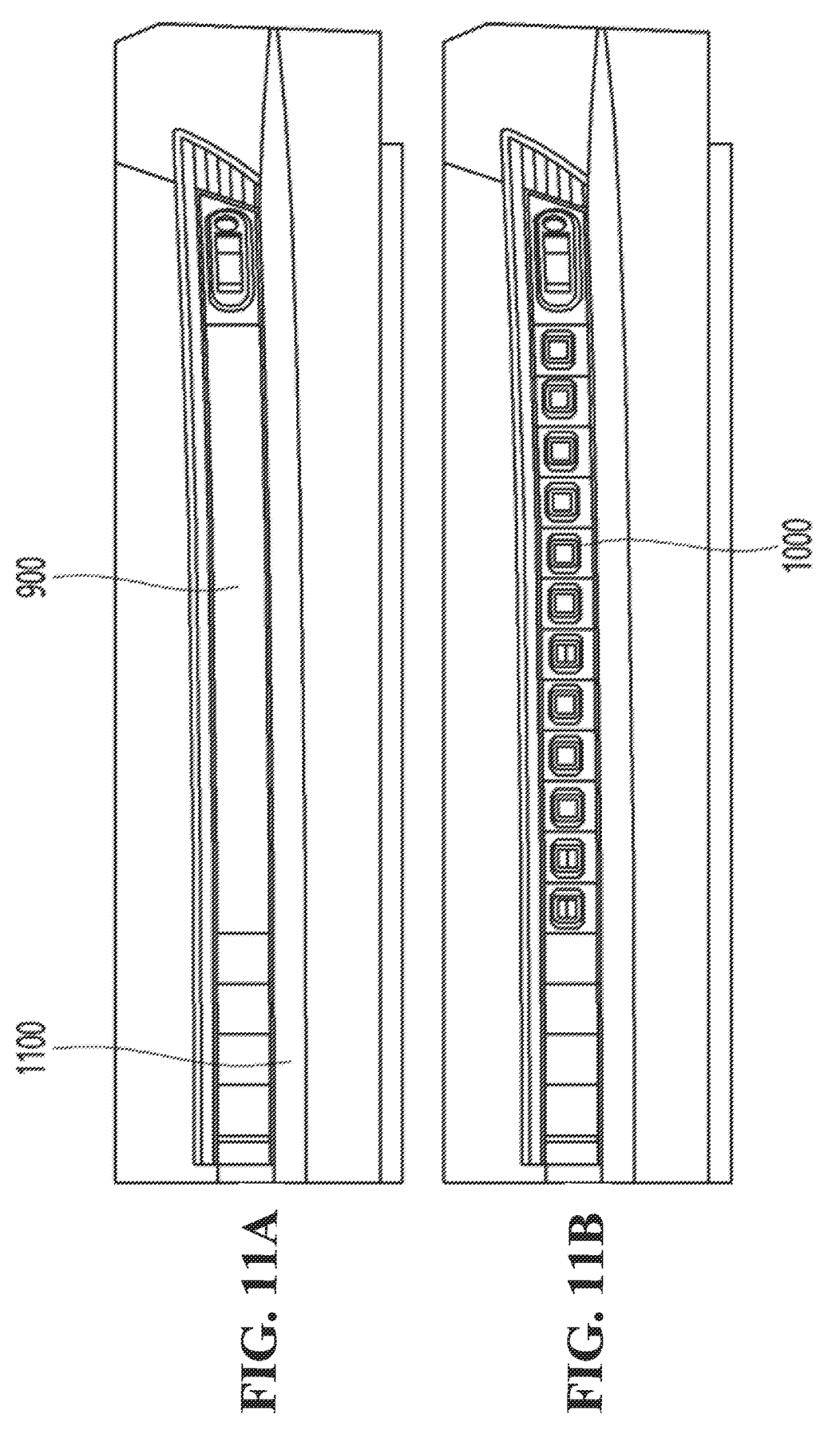
FIGS. 11A and 11B are views showing that a light source is opened or blocked by a cover part of FIG. 6.

The cover surface 640 may be made of a transparent material. In this case, as shown in FIG. 6, a desired light source image pattern may be formed on the front of the vehicle by the light source 510 when the cover part 600 is in the blocking position.

Alternatively, the cover part 600 may have the same color or different colors. The color may be implemented on the cover surface 640. In this case, the light source image pattern with various colors may be formed.

Hereinafter, a lamp device according to still another embodiment of the present disclosure is described with reference to FIGS. 12A to 17.

Figures 12A, 12B:
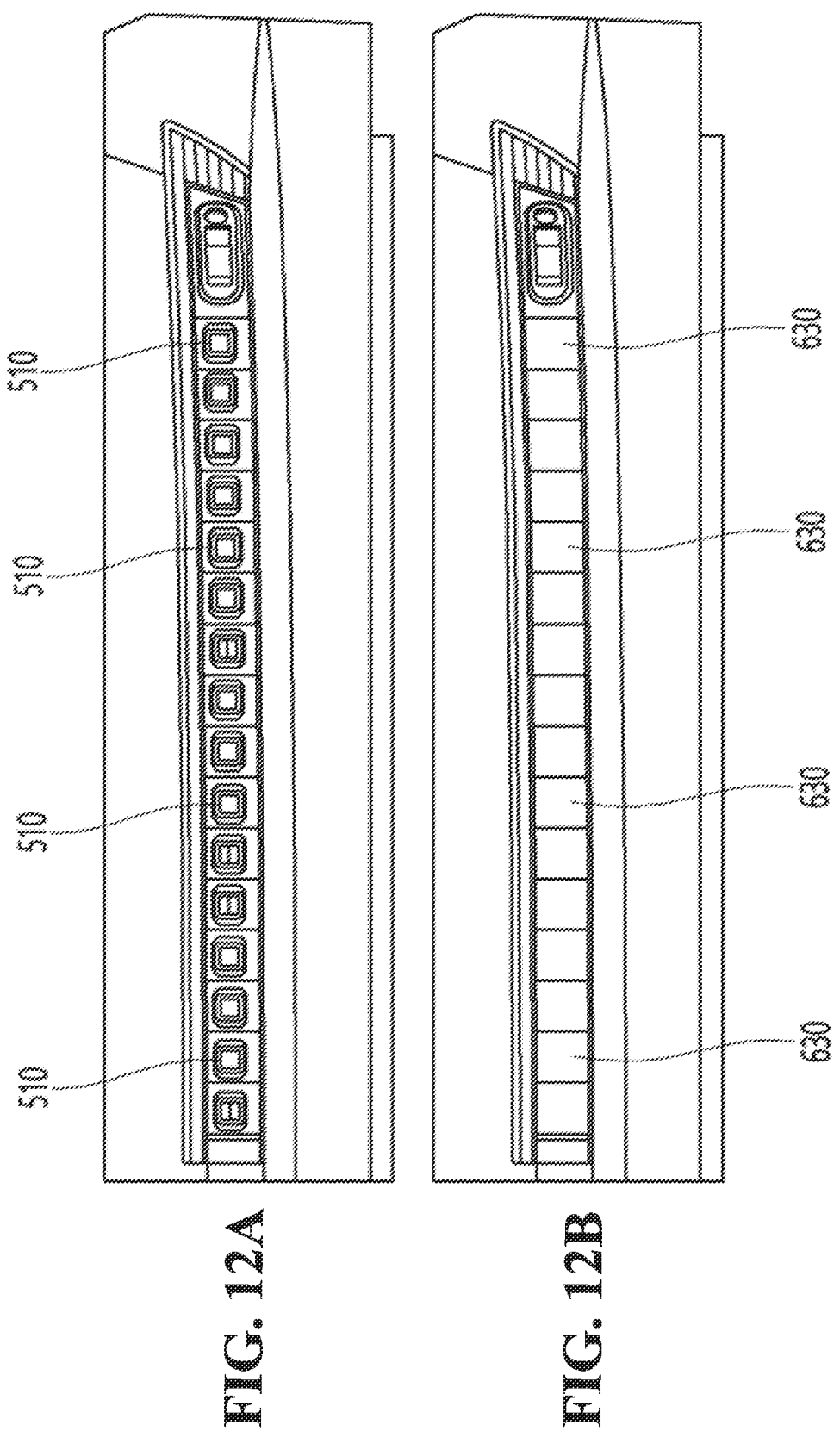
FIGS. 12A and 12B show a configuration of a vehicle lamp according to another embodiment of the present disclosure.

FIGS. 12A and 12B show a configuration of a lamp device of the present disclosure. Referring to FIGS. 12A and 12B, the lamp device according to still another embodiment may include a light emitting unit 1000, a bezel 1100, and a cover member 900.

The light emitting unit 1000 may be provided in such a manner that a plurality of lamps are combined with each other to emit light. In one example, the light emitting unit 1000 may be a light source provided to a headlamp. For example, the light emitting unit 1000 may include a halogen light, a high-intensity discharge (HID) light, a light emitting diode (LED light), or the like. The bezel 1100 may surround the light emitting unit 1000. In one example, the bezel 1100 may be positioned at the rear of the light emitting unit 1000, and have an opening through which light emitted by the light emitting unit 1000 passes.

The cover member 900 may open and close the front of the light emitting unit 1000. Referring to FIG. 13, the cover member 900 may include a cover plate 920 and a drive unit 940. The cover plate 920 may have a plate shape. In one example, the cover plate 920 may have a curved surface. In one example, the cover plate 920 may have a shape corresponding to a shape of the bezel 1100. The cover plate 920 may be disposed in a light distribution direction of light emitted from the light emitting unit 1000. In one example, the drive unit 940 may include a shaft 944 and an actuator 942. In one example, the drive unit 940 may be positioned at a lower part of the cover plate 920, and the shaft 944 may be coupled to the lower part of the cover plate 920. In one example, the shaft 944 may be coupled to a center point of the cover plate 920 in a width direction. That is, the shaft 944 may be coupled to the center point of the cover plate 920 at the bottom of the cover plate 920. In one example, the actuator 942 may move the shaft 944 in a vertical direction. In one example, the actuator 942 may be the linear actuator 942 linearly moving the shaft 944. In addition, the actuator 942 may be a direct current (DC) motor or a solenoid. The actuator 942 is not limited thereto, and may be various power sources.

Figure 13B:
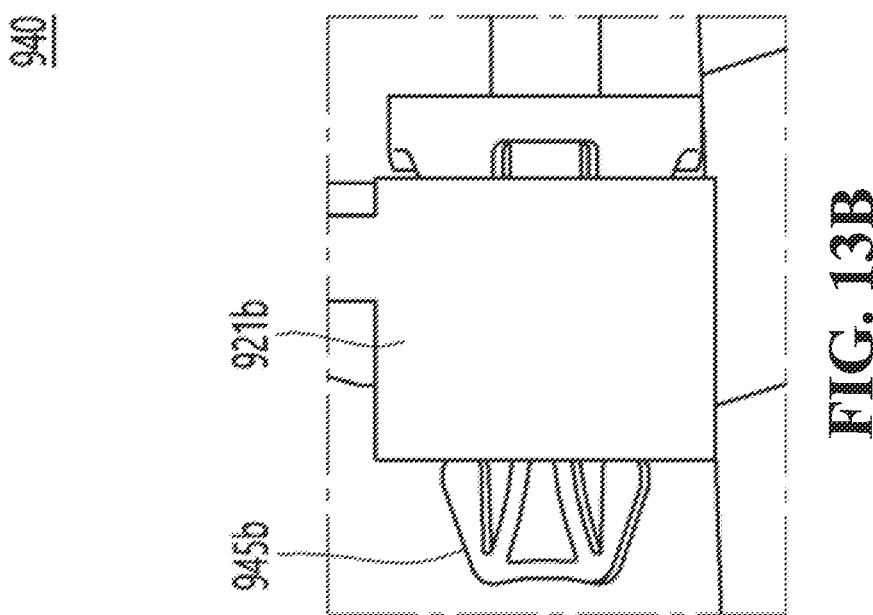
FIGS. 13A and 13B show a cover member of FIG. 12.
Figure 13A:
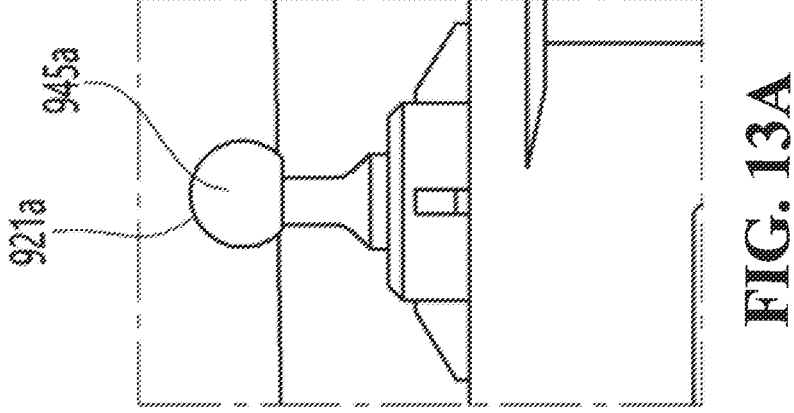
Figure 14:
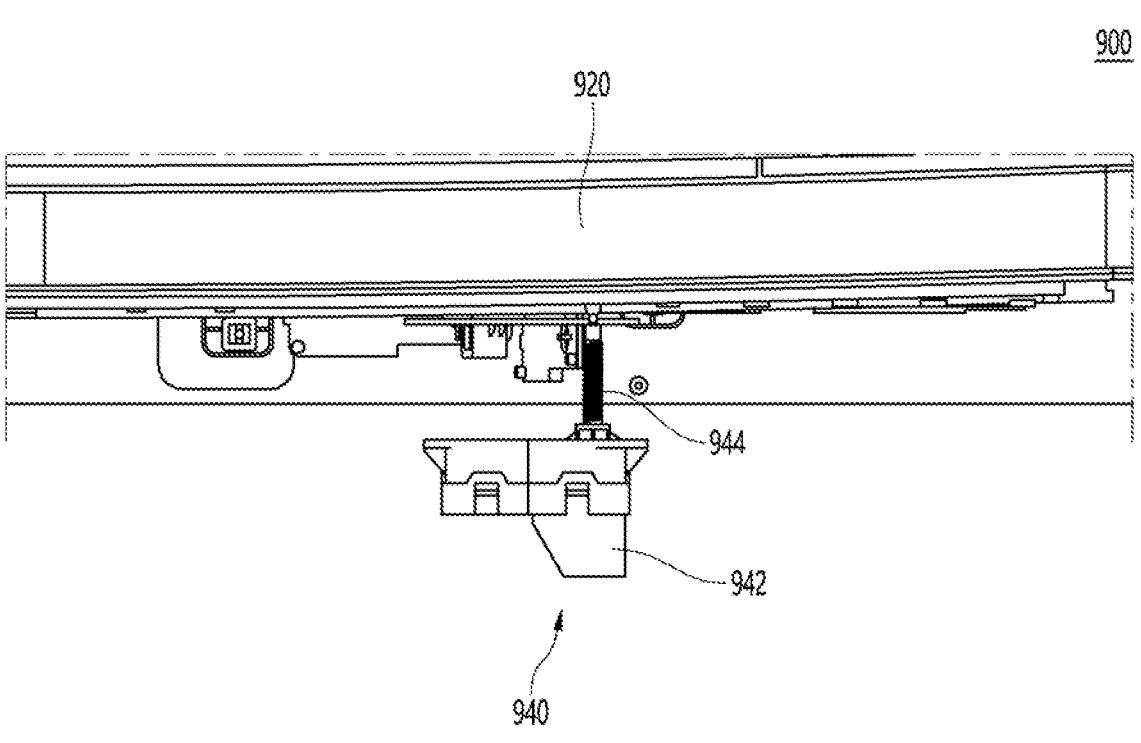
FIG. 14 shows a shaft of FIG. 12.

As shown in FIG. 14, the shaft 944 may have a fastening part 945, and the cover plate 920 may have an insertion part 921 into which the fastening part 945 is inserted, and the shaft 944 and the cover plate 920 may thus be coupled to each other. For example, as shown in FIG. 13A, the shaft 944 may include a ball-shaped fastening part 945a, and the cover plate 920 may include an insertion part 921a which has a shape corresponding to that of the fastening part 145a. The fastening part 945a may be inserted into the insertion part 921a, and the shaft 944 and the cover plate 920 may thus be coupled to each other. On the other hand, as shown in FIG. 13B, the shaft 944 may include a wing-shaped fastening part 945b which may be elastically pressed, and the actuator 942 may include an insertion part 921b through which the fastening part 945b may be inserted. The fastening part 945b may be inserted into the insertion part 921b by pressure fitting and penetrate the insertion part 921b, and the shaft 944 and the cover plate 920 may then be fixed to each other as the wing shape is restored.

Figure 15:
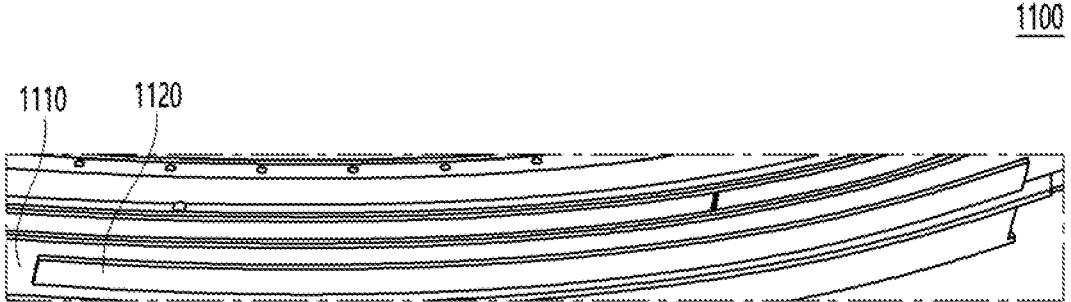
FIG. 15 shows a step part of FIG. 12.

Referring to FIG. 15, a groove 1120 may be formed in a step part 1110. In one example, the cover plate 920 may be positioned in the groove 1120 formed in the step part 1110 of the bezel 1100. The cover plate 920 may be moved in the groove 1120 by the drive unit 940. In one example, the cover plate 920 may be moved in the groove 1120 in a vertical direction. In one example, a shape of the groove 1120 may correspond to that of the cover plate 920. A size of the groove 1120 may be set in consideration of its shape tolerance and a movement space of the cover plate 920. In one example, the groove 1120 may have the same shape as that of the cover plate 920, and the size of the groove 1120 may be slightly larger than that of the cover plate 920. In one example, lubricant may be applied to the groove 1120. Accordingly, a load received by the drive unit 940 when the cover plate 920 is moved in the vertical direction may be reduced. As the size of the groove 1120 is only slightly larger than that of the cover plate 920, movement of the cover plate 920 in X-axis and Y-axis directions may be restricted when the cover plate 920 is moved in a Z-axis direction.

Figure 16:
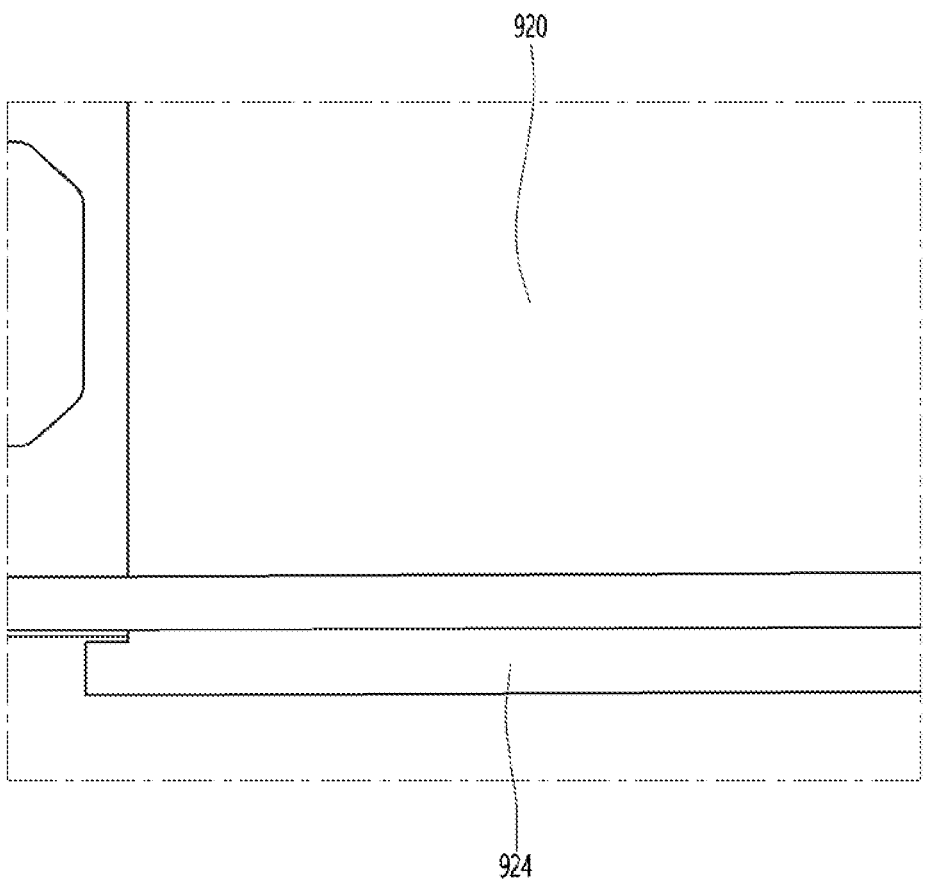
FIG. 16 shows a stopper of FIG. 12.

Referring to FIG. 16, the cover member 900 may further include a stopper 924 positioned at the bottom of the cover plate 920 and having a width larger than that of the groove 1120. The stopper 924 may prevent the cover plate 920 from completely escaping from the groove 1120. For example, the stopper 924 may prevent the cover plate 920 from completely escaping upward from the groove 1120 when the step part 1110 of the bezel 1100 is positioned below the opening, and the cover plate 920 is positioned in the groove 1120 formed in the step part 1110.

Referring back to FIGS. 12A and 12B, FIGS. 12A and 12B respectively show the cover member 900 of the present disclosure in the opening position and a closing position. FIG. 12A shows the cover member 900 in the closing position, and FIG. 12B shows the cover member 900 in the opening position. In one example, the cover member 900 may be moved between the opening position where the cover member 900 opens the front of the light emitting unit 1000 and the closing position where the cover member 900 closes the front of the light emitting unit 1000. Referring to FIGS. 12A and 12B, the opening position and the closing position may be provided in the vertical direction. In one example, the bezel 1100 may have the step part 1110 formed below the opening. In the opening position, the cover plate 920 may be inserted into the groove 1120 formed in the step part 1110 of the bezel 1100. In addition, in the closing position, the cover plate 920 may be positioned to correspond to the light emitting unit 1000 for the cover plate 920 to block light emitted from the light emitting unit 1000. For example, the cover plate 920 may block the opening of the bezel 1100 in the closing position. Accordingly, the cover plate 920 may be moved upward when moved from the opening position to the closing position, and moved downward when moved from the closing position to the opening position. On the other hand, the bezel 1100 may have the step part 1110 formed above the opening. In this case, the cover plate 920 may be moved downward when moved from the opening position to the closing position, and moved upward when moved from the closing position to the opening position.

Figure 17:
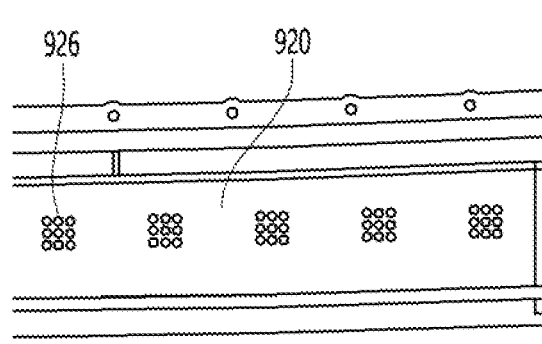
FIG. 17 shows a cover plate of FIG. 12.
Figure 17:
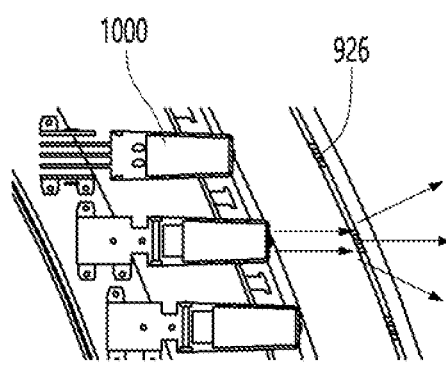

Referring to FIG. 17, the cover plate 920 may have a plurality of through holes 926 formed in the cover member 900. The through hole 926 may be positioned to correspond to the light emitting unit 1000 in the closing position. The through hole 926 may enable image conversion of light provided from the light emitting unit 1000. In one example, the lamp device may further include a controller controlling the light emitting unit 1000 and the cover member 900. The controller may control the light emitting unit 1000 and the cover member 900 for a current provided to the light emitting unit 1000 in the closing position and a current provided to the light emitting unit 1000 in the opening position to be different from each other. For example, the controller may control the light emitting unit 1000 and the cover member 900 for the current provided to the light emitting unit 1000 in the closing position to be lower than the current provided to the light emitting unit 1000 in the opening position.

The reason is that when the cover plate 920 is in the closing position, its position or DRL function may be turned on, and light may be stronger than required by law if activating a current used to operate an original main light source (e.g., low beam or high beam) (that is, light required from the main light source may be at least 100 times light required for each position). To prepare for this case, an operating current when the cover is closed may be necessarily required to be driven at a lower current value than a current value that originally turns on the main light source.

In one example, the cover plate 920 may have an achromatic color. Due to a feature of a lamp, there is a restriction on a color of light. When using a chromatic cover, light reflected by the cover may absorb light other than a chromatic color and only reflect light of that color, and actually, the color may thus also reflect light outside a regulation.

As set forth above, the image conversion lamp device according to the present disclosure may connect the drive unit to the light source module to thus rotate the optical module, thereby implementing the various optical image patterns and also converting the optical image pattern.

The embodiments of the present disclosure have been described above for illustrative purposes, and those skilled in the art to which the present disclosure pertains will appreciate that various modification and other equivalent embodiments are possible therefrom. Therefore, those skilled in the art will fully understand that the present disclosure is not limited to the specific embodiments described in the detailed description above. Thus, the true technical scope of the present disclosure should be defined by the technical spirit of the appended claims. In addition, it is to be understood that the present disclosure includes all modifications, equivalents, and substitutes within the spirit and scope of the present disclosure as defined by the appended claims.

What is claimed is:

1. A lamp device comprising:

a lamp housing installed on a front of a vehicle, and having an accommodation space therein;

a plurality of optical modules, each optical module disposed in the accommodation space and comprising a light source and an optical-module shaft;

a shaft gear mounted on each optical-module shaft;

a connecting gear, disposed between and meshing with the shaft gears, configured to rotate the optical modules, the connecting gear being mounted on a connecting shaft engaging the lamp housing and having a guide groove, the connecting shaft having a protruding guide received in the guide groove to limit an amount of rotation of the connecting gear; and a drive unit for transmitting rotational power to the connecting gear to rotate the optical modules.

2. The lamp device of claim 1, wherein each optical module further includes a lighting plate installed in front of the light source.

3. The lamp device of claim 2, wherein the lighting plate includes a front pattern configured to form a forward optical image pattern using light emitted from the light source.

4. The lamp device of claim 3, the lighting plates of the plurality of optical modules having a common front pattern.

5. The lamp device of claim 3, the front patterns of the plurality of optical modules being different from each other.

6. The lamp device of claim 2, wherein the lighting plates of the plurality of optical modules are of colors different from each other.

7. The lamp device of claim 2, wherein the lighting plates of the plurality of optical modules are of a common color to produce a color-uniform optical image pattern.

8. The lamp device of claim 2, wherein:

each optical module further includes a heat dissipation unit to dissipate heat from the light source, and the heat dissipation unit is spaced apart from the light source by a set distance.

9. The lamp device of claim 2, wherein: the plurality of optical modules are arranged along a line corresponding to a shape of the lamp housing.

10. The lamp device of claim 9, wherein the plurality of optical modules are arranged along a curved line to correspond to a curvature of the lamp housing.

11. The lamp device of claim 9, wherein:

the drive unit comprises a direct-current motor lacking positional feedback; and the guide groove and protruding guide cooperate to define a maximum rotation angle of the optical modules.

12. The lamp device of claim 2, wherein each of the lighting plates of the plurality of optical modules includes a side pattern on one side thereof that becomes visible when a corresponding optical module is rotated away from a forward-facing position.

\* \* \* \* \*